US012637330B2

(12) United States Patent
Räsänen et al.

(10) Patent No.: US 12,637,330 B2
(45) Date of Patent: May 26, 2026

(54) METHOD OF ASSEMBLING AN ELEVATOR AND AN ELEVATOR

(71) Applicant: Kone Corporation, Helsinki (FI)

(72) Inventors: Matti Räsänen, Helsinki (FI); Otto Lanz, Helsinki (FI); Juha Helenius, Helsinki (FI); Markku Haapaniemi, Helsinki (FI); Mikko Kukkola, Helsinki (FI); Wen Sheng Luo, Kunshan (CN); Kai Guo, Kunshan (CN); XueSong Pan, Kunshan (CN); Zhimin Zhang, Kunshan (CN); Janne Laine, Helsinki (FI); Mika Ijäs, Helsinki (FI)

(73) Assignee: KONE CORPORATION, Helsinki (FI)

( * ) Notice: Subject to any disclaimer, the term of this patent is extended or adjusted under 35 U.S.C. 154(b) by 0 days.

(21) Appl. No.: 18/912,018

(22) Filed: Oct. 10, 2024

(65) Prior Publication Data

US 2025/0033933 A1 Jan. 30, 2025

Related U.S. Application Data

(63) Continuation of application No. PCT/CN2022/086606, filed on Apr. 13, 2022.

(51) Int. Cl.

*B66B 19/00* (2006.01)
*B66B 9/00* (2006.01)
*B66B 11/00* (2006.01)

(52) U.S. Cl.

CPC .............. *B66B 19/002* (2013.01); *B66B 9/00* (2013.01); *B66B 11/004* (2013.01); *B66B 19/005* (2013.01)

(58) Field of Classification Search

CPC ....... B66B 19/002; B66B 9/00; B66B 11/004; B66B 19/005

See application file for complete search history.

(56) References Cited

U.S. PATENT DOCUMENTS 3,851,736 A 12/1974 Westlake et al.
4,345,671 A * 8/1982 Tosato .................. B66B 19/002 52/30

(Continued)

FOREIGN PATENT DOCUMENTS

EP 1717186 A1 11/2006
EP 3691985 A1 8/2020

(Continued)

OTHER PUBLICATIONS

International Search Report and Written Opinion for International Application No. PCT/CN2022/086606 dated Sep. 29, 2022.

*Primary Examiner* — Minh Truong
*Assistant Examiner* — Michelle M Mudwilder
(74) *Attorney, Agent, or Firm* — HARNESS, DICKEY & PIERCE, P.L.C.

(57) ABSTRACT

An elevator with an elevator car moving between landings at different levels in a first section of an elevator shaft that includes a second section located above the first section. The second section includes a lifting device mounted under a crash deck and an installation platform which is movably suspended by the lifting device in the second section. At least one crash deck is located between the first and the second sections.

17 Claims, 5 Drawing Sheets

(56) References Cited

U.S. PATENT DOCUMENTS

| | | | | |
|---|---|---|---|---|
| 7,635,049 | B2 * | 12/2009 | Van Der Meijden | B66B 19/002 187/401 |
| 8,485,319 | B2 * | 7/2013 | Peacock | B66B 7/027 187/414 |
| 9,617,121 | B2 * | 4/2017 | Bolme | B66B 19/002 |
| 9,890,019 | B2 * | 2/2018 | Kere | E04G 3/28 |
| 11,208,296 | B2 * | 12/2021 | Christen | B66B 19/002 |
| 11,858,778 | B2 * | 1/2024 | Studer | B66B 9/00 |
| 12,043,519 | B2 * | 7/2024 | Christen | B66B 19/00 |
| 12,325,611 | B2 * | 6/2025 | Bizzozero | B66C 15/02 |
| 2015/0307322 | A1 * | 10/2015 | Peacock | B66B 7/064 187/254 |
| 2016/0152442 | A1 * | 6/2016 | Weber | B66B 19/005 187/359 |
| 2018/0273349 | A1 * | 9/2018 | Weibel | B66B 7/024 |

FOREIGN PATENT DOCUMENTS

| | | | |
|---|---|---|---|
| EP | 3816088 | A1 | 5/2021 |
| EP | 3872019 | A1 | 9/2021 |

* cited by examiner

METHOD OF ASSEMBLING AN ELEVATOR AND AN ELEVATOR

CROSS-REFERENCE TO RELATED APPLICATION

This application is a continuation of PCT International Application No. PCT/CN2022/086606 which has an International filing date of Apr. 13, 2022, the entire contents of which are incorporated herein by reference.

TECHNICAL FIELD

This invention relates to a method of assembling an elevator and in particular to construction time use of an elevator.

BACKGROUND

A challenge of constructing a building with an elevator is transportation of material and personnel at the building site.

A common solution is to utilize a separate construction time elevator or elevators which are mounted along a side of the building which is being built. However, this involves a lot of work and costs, as the construction time elevators continuously needs to be modified as the height of the building increases, and as they eventually need to be taken apart and transported elsewhere when the building is completed.

In particularly for high buildings where lift travels are very long, installation of construction time elevators, are challenging. Additionally, the construction time elevators are installed outside which makes use of them dependent on the weather conditions, such as rain, snow or storm.

SUMMARY

An object of the inventive concepts is to solve the above-mentioned drawback and to provide a solution simplifying assembly of an elevator. This object is achieved with a method and an elevator according to some example embodiments as subsequently described.

When the assembly of the elevator is implemented in phases, section by section, such that installation of guide rails is implemented in an upper section, while an elevator car can already be launched for use in a lower section of the elevator shaft, it becomes possible to take an elevator car into use in a part of the elevator shaft at a much earlier stage than in previously known solutions.

Preferred embodiments of the invention are disclosed in the dependent claims.

BRIEF DESCRIPTION OF THE DRAWINGS

In the following the present invention will be described in closer detail by way of example and with reference to the attached drawings, in which.

DETAILED DESCRIPTION

Figure 1A:
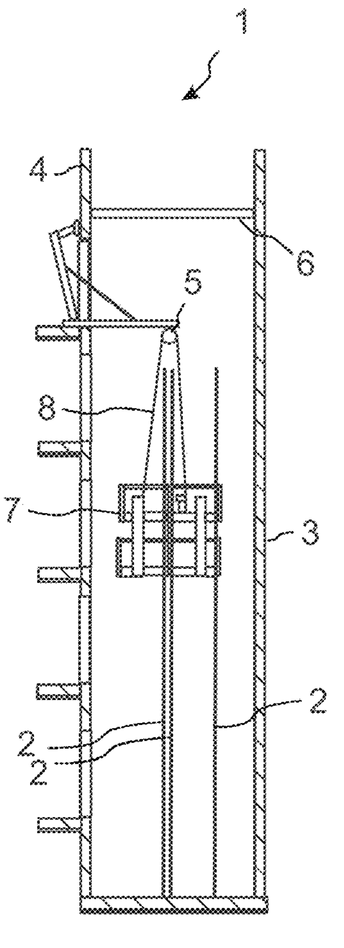
FIGS. 1*a* and 1*b* illustrate a first embodiment of assembling an elevator.
Figure 1B:
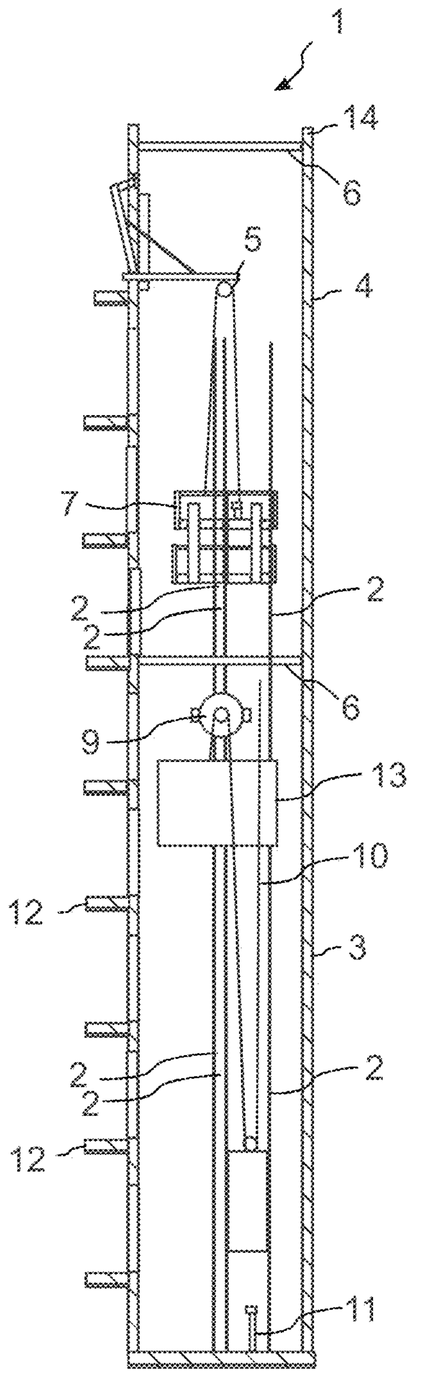

FIGS. 1*a* and 1*b* illustrate a first embodiment of assembling an elevator. FIG. 1*a* and 1*b* illustrate the same elevator shaft 1 at different moments of time.

In FIG. 1*a* a preparation phase of assembling guide rails 2 and other elevator devices is in progress in a lowermost first section 3 of the elevator shaft 1 while upper sections of the elevator shaft are still under construction. Consequently, at this stage the elevator shaft 1 has not yet reached its final height, but instead only one section of the elevator shaft 1 is ready, and construction of a second section 4 of the elevator shaft 1 has begun.

The preparation phase is implemented by means of a lifting device 5 which has been temporarily mounted into the elevator shaft 1 under a crash deck 6. The crash deck 6 provides protection against objects possibly falling downwards from the second section 4 while construction of the elevator shaft continues.

In the illustrated example an installation platform 7 is movably suspended from a rope 8 by the lifting device 5. This installation platform 7 may be used by personnel carrying out the installation work of the rails 2 by attaching them to the wall of the elevator shaft 1. In the examples illustrated in the figures, it is by way of example assumed that the installation platform is provided only with a floor and low walls, such that it has an upwardly open basket-like configuration. However, instead of utilizing such a dedicated installation platform, it is possible in some implementations to use the roof of an elevator car as the installation platform. In that case detachable low walls may for safety reasons be temporarily mounted on top of the roof during the installation. After installation, these low walls may be removed, and the elevator car can be taken into use for elevator runs in the elevator shaft.

In the situation illustrated in FIG. 1*b* the preparation phase of assembling guide rails has been completed in the lowermost first section 3 of the elevator shaft 1. At this stage the construction work of the elevator shaft 1 has reached a phase where the second section 4 of the elevator shaft 1 has been completed and a preparation phase has been initiated in the second section 4. Consequently, the lifting device 5 is now located under a crash deck 6 in the second section 4 and the installation platform 7 is movably suspended from the rope 8 by the lifting device 5 in the second section 4. A crash deck 6 prevents objects from falling from the second section 4 to the first section 3 while the preparation phase of assembling guide rails 2 continues in the second section 4.

In FIG. 1*b* a launch phase of taking an elevator car 13 into use in the first section 3 has been finalized. During the launch phase a hoisting machine 9 has been mounted in the elevator shaft 1, the elevator car 13 and a counterweight have been suspended by a rope 10 from the hoisting machine 9, and other devices such as buffers 11 have been mounted in the elevator shaft 1. At this stage the elevator car 13 is ready for construction time use in the elevator shaft 1 such that the hoisting machine 8 moves it between landings 12 at different levels in the first section 3 of the elevator shaft 1. This makes it possible to transport personnel participating in the construction of the building where the elevator is located and also in the construction of the upper sections of the elevator shaft with the elevator car 13. Additionally, the elevator car 13 may be used to transport material.

In a next stage, not illustrated in FIGS. 1*a* and 1*b*, the preparation phase is repeated for a third section 14 being constructed on top of the second section 4 in FIG. 1*b*. Additionally, at this stage a launch phase is implemented for the second section 4 to allow the elevator car 13 to complete elevator runs in all sections completed so far, in this case the first section 3 and the second section 4. After this the work continues by repeating preparation phases and launching phases until each section of the first elevator shaft 1 has been built, and the elevator car has been taken into use in all of the sections.

One alternative to mount the hoisting machine 9 into the elevator shaft 1 is to attach the hoisting machine 9 to a guide rail 2 intended to be used by the elevator car. In that case brackets can be utilized to attach the hoisting machine 9 to the guide rail 2 at a back side of the guide rail 2. Consequently, the hoisting machine is located on the back side of the guide rail, while the elevator will move along the front side of the guide rail, in other words on the opposite side of the guide rail as compared to the location of the hoisting machine.

Figure 2:
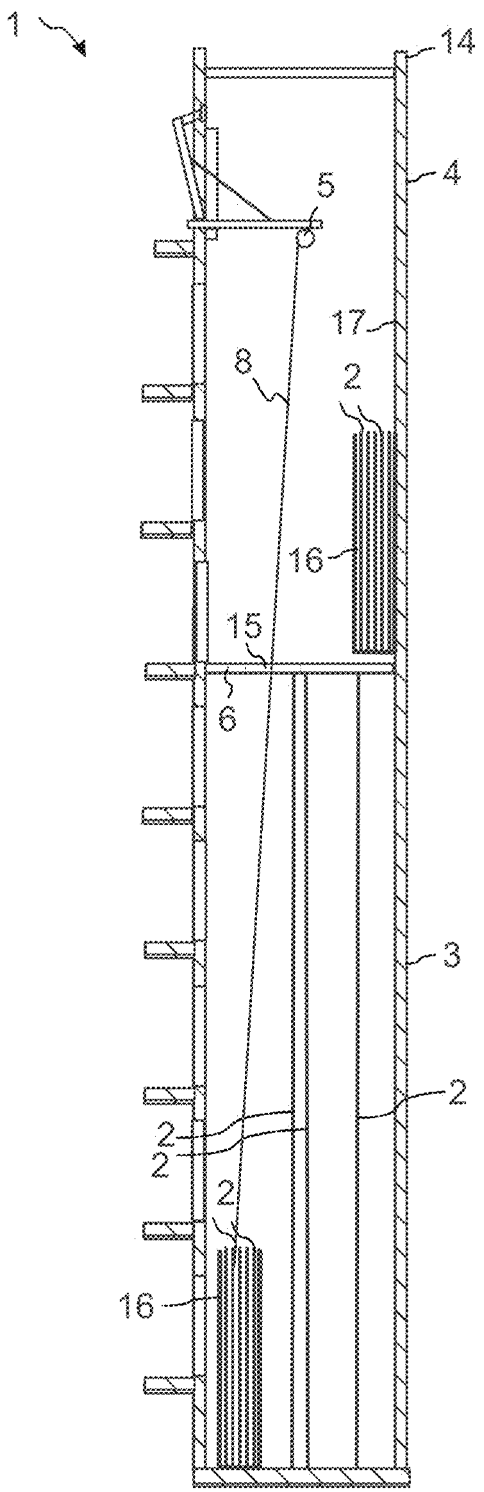
FIG. 2 illustrates a second embodiment of assembling an elevator.

FIG. 2 illustrates a second embodiment of assembling an elevator. The embodiment of FIG. 2 is very similar to the embodiment explained in connection with FIGS. 1*a* and 1*b*. In the following the embodiment of FIG. 2 will be mainly explained by pointing out the differences between these embodiments.

FIG. 2 illustrates an additional phase in the assembly of an elevator which can be implemented together with the phases explained in connection with FIGS. 1*a* and 1*b*. FIG. 2 illustrates the elevator shaft 1 at a stage when the preparation phase of assembling guide rails 2 in the lowermost first section 3 of the elevator shaft 1 has been completed. Alternatively, the additional phase may be implemented before the preparation phase has been initiated in the lowermost first section 3, in other words before assembling guide rails 2 in the first section. However, the launching phase of taking an elevator car into use in the first section 3 has not yet been initiated when the additional phase is initiated.

The additional phase of FIG. 2 is a transport phase, where guide rails 2 intended for use in upper sections of the elevator shaft are transported and stored for subsequent use. In the situation illustrated in FIG. 2, the last section where the preparation phase has ended is the first section 3. Consequently, guide rails 2 are lifted from the first section 3 with the lifting device 5 and the rope 8, for instance, via an opening 15 in the crash deck 6 for storage in the second section 4. Some of the lifted guide rails 2 may be intended for use in the second section 4, some in the third section 14 which has not yet been completed and some in future sections above the third section 14 which are not even yet under construction in the situation illustrated in FIG. 2. This transport phase significantly simplifies handling and transporting of guide rails as compared to previous solutions where the guide rails are transported to upper parts of an elevator shaft via routes located outside of the elevator shaft.

In the transport phase the guide rails 2 may be lifted one by one. However, in FIG. 2 it has by way of example been assumed that receptacles 16 dimensioned to contain several guide rails 2 are in use. This significantly speeds up the transport phase, as in that case several guide rails 2 may be lifted at once to the second section 4 with each receptacle 16. In the second section the receptacles may be emptied and lowered for a new lift of guide rails. Alternatively, the receptacles 16 may be used for storing the guide rails in the second section 4. This is particularly advantageous, as a part of the lifted guide rails will in a next transport phase again be lifted upwards to a new section of the elevator shaft, due to which unloading and loading of the guide rails from and to the receptacles can be minimized.

Storage of the lifted guide rails and receptacles can be implemented in several different ways. One alternative illustrated in FIG. 2 by way of example, is to attach the lifted receptacles to a wall 17 in the elevator shaft 1. In case no receptacles are in use, single guide rails may be attached to the wall for storage. Once lifting of guide rails to the second section 4 has been completed, the launching phase of taking the elevator car 13 in use in the first section 3 can be initiated, and the preparation phase of assembling guide rails 3 in the third section can be initiated.

In addition to lifting and storing guide rails, the transport phase may also involve lifting and storing other material needed later in the upper sections of the elevator shaft. Such material may include doors for the openings at the landings of the elevator shaft, for instance.

Figure 3:
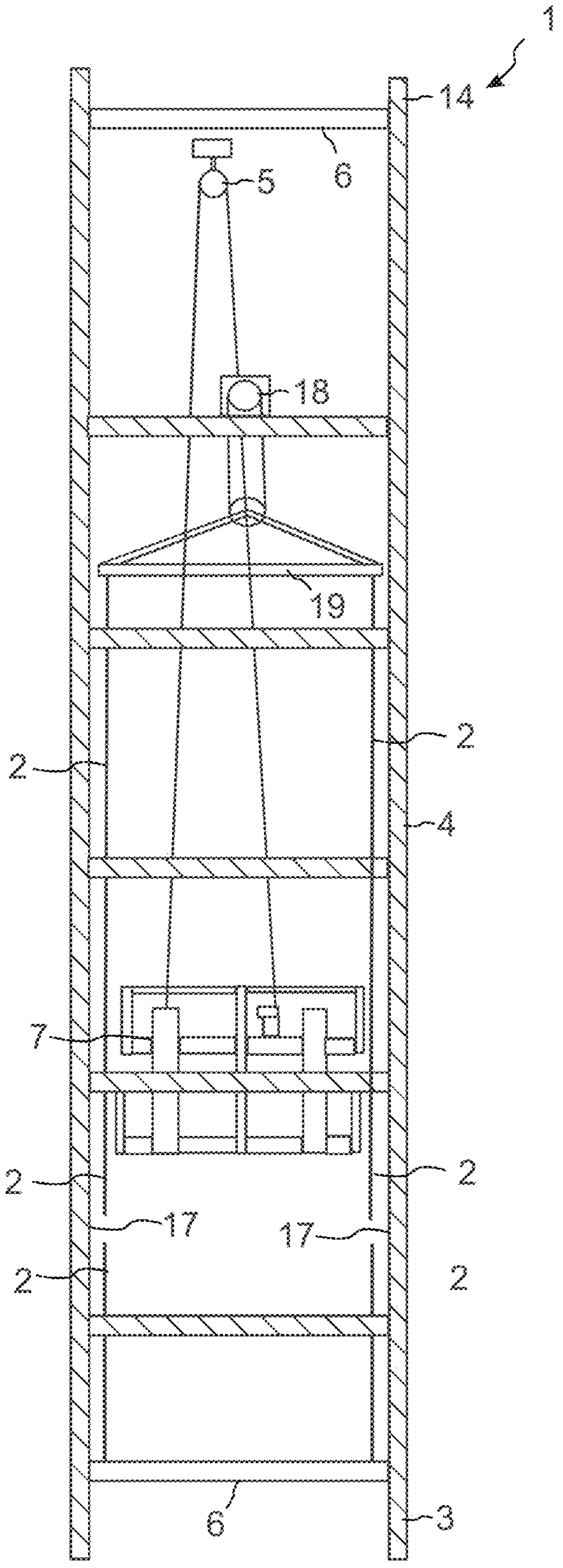
FIG. 3 illustrates a third embodiment of assembling an elevator.

FIG. 3 illustrates a third embodiment of assembling an elevator. The embodiment of FIG. 3 is very similar to the embodiments explained in connection with FIGS. 1*a*, 1*b* and 2. In the following the embodiment of FIG. 3 will be mainly explained by pointing out the differences between these embodiments.

FIG. 3 illustrates an alternative way of implementing the preparation phase of assembling guide rails 2 in a section of a first elevator shaft 1. In FIG. 3 the lifting device 5 is utilized to move the installation platform 7 with persons standing on it, as in the previous embodiments. A second lifting device 18 has been provided to the second section 4 for lifting guide rails 2 to their intended positions in the first section 4. The second lifting device 18 is utilized to suspend and move a horizontal beam 19 in the second section 4. Each end of the beam suspends a plurality of guide rails 2 in a vertical position with their opposite ends attached to each other. When the rope of the second lifting device 18 is used 2:1, the lifting capacity may be 1000 kg, for instance, which makes it possible to lift 6-8 guide rails (3-4 pairs) simultaneously with the horizontal beam 19, for instance. Naturally the amount may vary depending on the type of the lifting device and the guide rail size, for instance.

FIG. 3 also illustrates lowermost a pair of guide rails 2 which have already been attached into their correct intended positions on the walls 17 of the second section 4. At this stage, the horizontal beam 19 can be lowered until the lowermost ends of the guide rails 2 hanging from it are correctly aligned to the upper ends of the attached guide rails 2. This makes it possible to connected by suitable attachment means, such as bolts and fishplates, via the respective upper and lower ends of the guide rails to each other. Finally, the guide rails hanging from the horizontal beam 19 can be attached to the walls 17 of the second section 4.

Figure 4A:
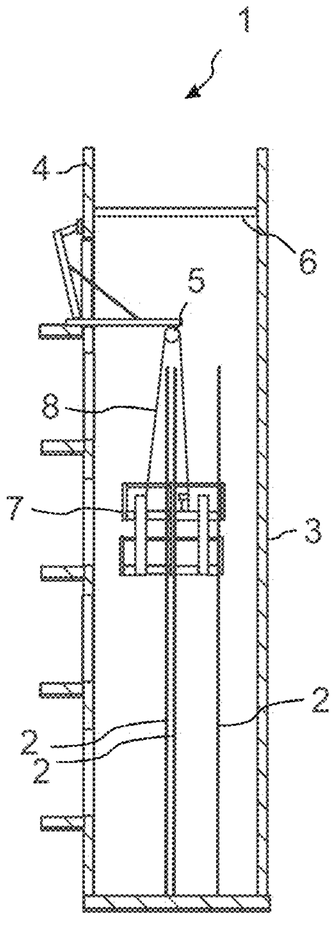
FIGS. 4*a* and 4*b* illustrate a fourth embodiment of assembling an elevator, and FIG. 5 illustrate a fifth embodiment of assembling an elevator.
Figure 4B:
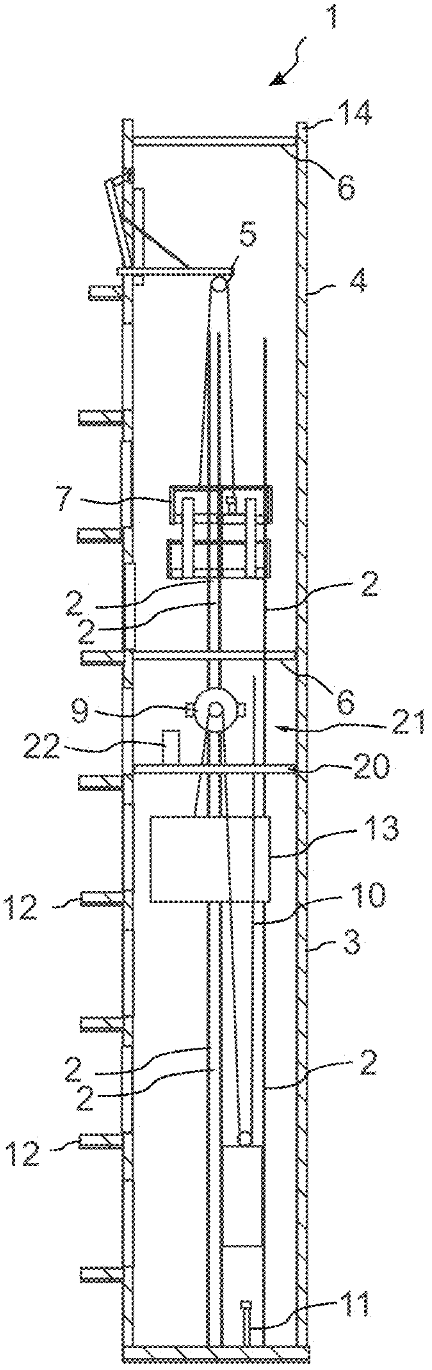

FIGS. 4*a* and 4*b* illustrate a fourth embodiment of assembling an elevator. The embodiment of FIGS. 4*a* and 4*b* is very similar to the embodiments explained previously. In the following the embodiment of FIGS. 4*a* and 4*b* will be mainly explained by pointing out the differences between these embodiments.

In FIG. 4*a* the preparation phase of assembling guide rails 2 in the first section has been implemented as explained in connection with FIG. 1*a*. However, from FIG. 4*b* it can be seen that during the launch phase a second crash deck 20 has been added to the elevator shaft 1. Consequently, the hoisting machine 9 is located between the first crash deck 6 and the second crash deck 20, which separate a space 21 from the first section 3 and the second section 4 of the first elevator shaft 1. This space 21 may be utilized as a temporary machine room where in addition to the hoisting machine 9, also an elevator control cabinet 22 containing electrical devices may located. This significantly simplifies construction time use of an elevator car due to easier maintenance and installation work. Similarly as previously explained in connection with FIG. 1*b*, the hoisting machine 9 may be arranged into the elevator shaft by attaching it to a guide rail 2. In that case the hoisting machine may be attached to the back side of the guide rail, while the elevator car will run on the opposite front side of the same guide rail.

Figure 5:
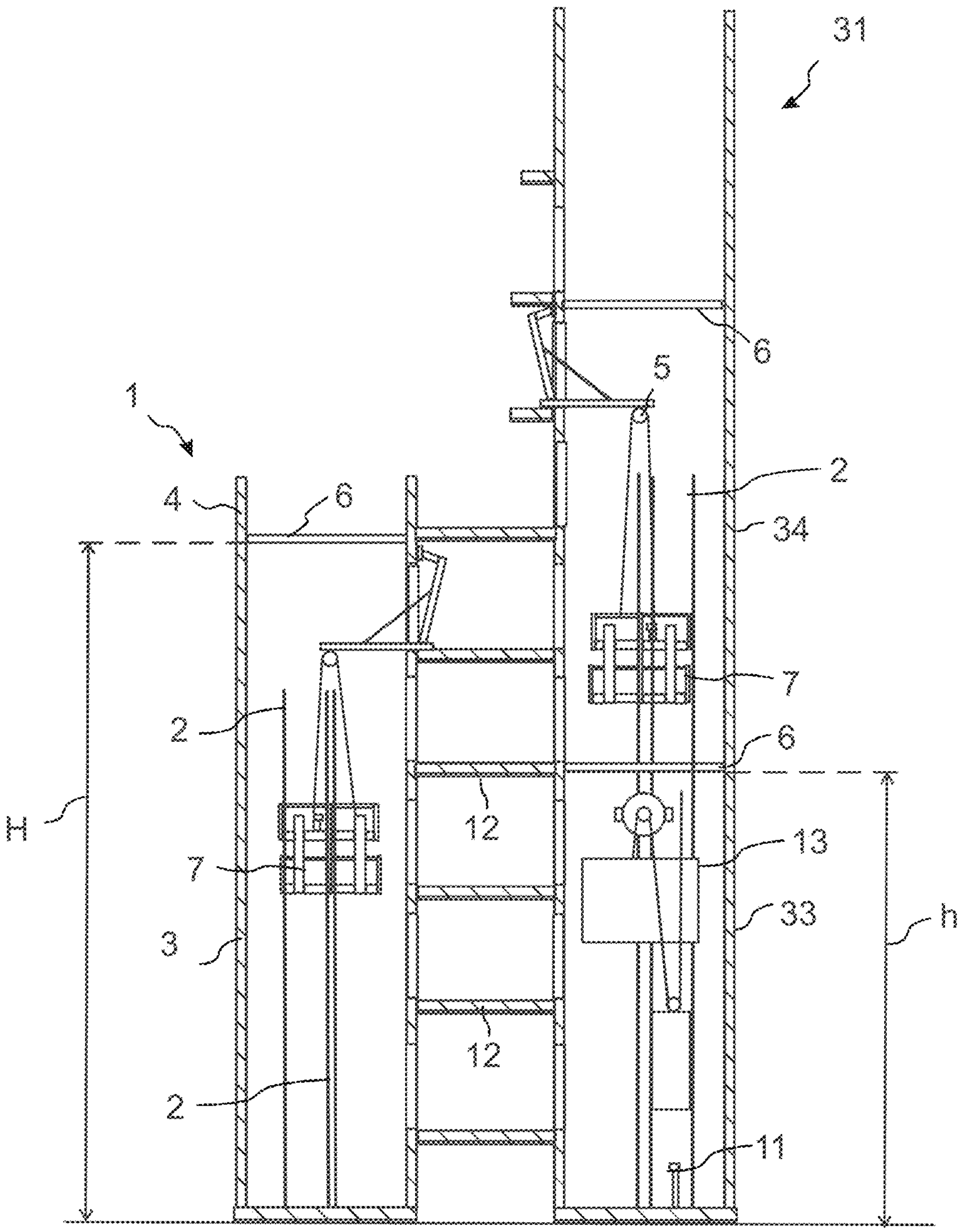

FIG. 5 illustrate a fifth embodiment of assembling an elevator. The embodiment of FIG. 5 is very similar to the embodiments explained previously. In the following the embodiment of FIGS. 4*a* and 4*b* will be mainly explained by pointing out the differences between these embodiments.

In FIG. 5 two different elevator shafts of a building under construction are illustrated. The first elevator shaft 1 to the left in FIG. 5 is being built as has previously been explained in connection with FIGS. 1*a* and 1*b*. In the situation illustrated in FIG. 5, the preparation phase of assembling guide rails 2 in a first section 3 of the first elevator shaft 1 is being carried out as has been explained in connection with FIG. 1*a*, for instance.

The second elevator shaft 31 to the right in FIG. 5 is also being built as has been explained in connection with FIGS. 1*a* and 1*b*. In the situation illustrated in FIG. 5, the second elevator shaft has reached a stage, where the launching phase has been completed in the first section 33, while the preparation phase of assembling guide rails 2 in the second section 34 of the second elevator shaft 31 is continuing.

As can be seem from FIG. 5, the preparation and launching phases of the second elevator shaft 31 are carried out for sections 33 and 34 having a different height h than the corresponding heights H of the sections 3 and 4 in the first elevator shaft 1. An advantage with such a solution is that the launching phases for the sections of the different shafts can be finalized at different moments of time. This is advantageous, as construction time use of the elevator car in the first shaft 1 can be used to support further building of the second shaft 31 and vice versa.

For instance, assuming that the first section 33 of the second shaft 31 is first completed such that the preparation and launching phases are finalized. From this moment personnel and material needed for completing the construction of the first section of the first shaft 1 can be transported with the elevator car of the second shaft 31. After this, when the first section 3 of the first shaft 1 is completed such that the preparation and launching phases are finalized, personnel and material needed for completing the construction of the second section 34 of the second shaft 31 can be transported with the elevator car of the first shaft 1. Such an alternated building and completion of the sections of the different elevator shafts significantly simplifies and speeds up the construction of both elevator shafts.

Though FIG. 5 only illustrates two elevator shafts of a building, it is naturally possible that even more elevators shafts of the same building are being built in a similar flexible way. This offers the possibility of even more flexible solutions of supporting the building work by different section heights and construction time use of the elevator cars in the sections that have been so far completed.

It is to be understood that the above description and the accompanying figures are only intended to illustrate the present invention. It will be obvious to a person skilled in the art that the invention can be varied and modified without departing from the scope of the invention.

The invention claimed is:

1. A method of assembling an elevator, comprising:

a preparation phase of assembling first guide rails in a section of a first elevator shaft under construction by utilizing a lifting device mounted under a first crash deck, after the section of the first elevator shaft has been built;

a launching phase of putting an elevator car into use in the section of the first elevator shaft where the preparation phase is completed, wherein the preparation phase and the launching phase are repeated in sections of the first elevator shaft until all the sections of the first elevator shaft have been built and the elevator car has been put taken into use in all the sections of the first elevator shaft; and transport phases during which second guide rails intended for use in upper sections of the sections of the first elevator shaft are lifted and stored in receptacles for subsequent use before the launching phase is initiated in a lower section of the sections of the first elevator shaft.

2. The method of assembling the elevator according to claim 1, further comprising:

lifting a third guide rail to hang from the lifting device;

attaching an upper end of a fourth guide rail to a lower end of the third guide rail;

attaching a plurality of fifth guide rails end-to-end to a lower end of the fourth guide rail until a predetermined number of guide rails are hanging from each other and the lifting device; and attaching the predetermined number of guide rails hanging from each other and the lifting device to a predetermined location on a wall of the first elevator shaft.

3. The method of assembling the elevator according to claim 1, further comprising:

lifting a first pair of guide rails to hang from the lifting device in parallel at a distance from each other;

attaching upper ends of a second pair of guide rails to lower ends of the first pair of guide rails hanging from the lifting device;

attaching a plurality of third pairs of guide rails end-to-end to lower ends of the second pair of guide rails until a predetermined number of pairs of guide rails are hanging from each other and the lifting device; and attaching the predetermined number of pairs of guide rails hanging from each other and the lifting device to predetermined locations on one or more walls of the first elevator shaft.

4. The method of assembling the elevator according to claim 1, wherein the launching phase comprises:

attaching a hoisting machine to a guide rail mounted in the first elevator shaft; and putting the elevator car into use in the sections of the first elevator shaft which have been assembled by moving the elevator car with the hoisting machine.

5. The method of assembling the elevator according to claim 1, wherein the launching phase comprises:

providing a second crash deck in a last section of the first elevator shaft where the preparation phase has been completed;

providing a hoisting machine and an elevator control cabinet in a space between the first crash deck and the second crash deck; and putting the elevator car into use in the sections of the first elevator shaft which have been assembled by moving the elevator car with the hoisting machine.

6. The method according to claim 1, wherein the method further comprises:

a second preparation phase of assembling third guide rails in a section of a second elevator shaft under construction by utilizing a second lifting device mounted under a second crash deck, after the section of the second elevator shaft has been built; and a second launching phase of putting a second elevator car into use in the section of the second elevator shaft where the second preparation phase is completed, and wherein the second preparation phase and the second launching phase of the second elevator shaft are carried out for sections of the second elevator shaft having different heights than corresponding heights of the sections of the first elevator shaft, and the second preparation phase and the second launching phase are repeated in all the sections of the second elevator shaft until all the sections of the second elevator shaft have been built and the second elevator car has been put into use in all the sections of the second elevator shaft.

7. An elevator comprising:

an elevator car configured to move between landings at different levels in a first section of an elevator shaft;

a second section of the elevator shaft located above the first section, the second section comprising a lifting device mounted under a first crash deck, and an installation platform, the installation platform configured to be movably suspended by the lifting device in the second section of the elevator shaft; and at least one additional crash deck located between the first section of the elevator shaft and the second section of the elevator shaft, wherein the second section of the elevator shaft comprises containers configured to store a plurality of guide rails therein.

8. The elevator according to claim 7, wherein one or more of the containers are attached to a wall of the second section of the elevator shaft.

9. The elevator according to claim 7, wherein the at least one additional crash deck defines an opening therein, and the lifting device is configured to lift a container from among the containers that contains guide rails from among the plurality of guide rails from the first section to the second section through the opening.

10. The elevator according to claim 7, wherein the second section of the elevator shaft comprises a horizontal beam configured to be is vertically movable in the second section, each end of the horizontal beam is configured to suspend additional guide rails in a vertical position with opposite ends of the additional guide rails attached to each other for transporting the additional guide rails to predetermined locations on one or more walls of the second section.

11. The elevator according to claim 7, further comprising:

a hoisting machine attached to a guide rail mounted on a wall of the elevator shaft, the hoisting machine configured to move the elevator car in the first section.

12. The elevator according to claim 11, wherein the hoisting machine is attached to a back side of the guide rail mounted on the wall of the elevator shaft, the elevator car is configured to be movable on a front side of the guide rail mounted on the wall of the elevator shaft, and the front side is opposite the back side.

13. The elevator according to claim 7, wherein the at least one additional crash deck comprises at least a second crash deck, and a third crash deck between the first section and the second section, and the elevator further comprises a hoisting machine and an elevator control cabinet in a space between the second crash deck and the third crash deck, the hoisting machine configured to move the elevator car in the first section.

14. A method of assembling an elevator:

a preparation phase of assembling first guide rails in a section of a first elevator shaft under construction by utilizing a lifting device mounted under a first crash deck, after the section of the first elevator shaft has been built;

a launching phase of putting an elevator car into use in the section of the first elevator shaft after the preparation phase is completed, wherein the preparation phase and the launching phase are repeated in sections of the first elevator shaft until all sections of the first elevator shaft have been built and the elevator car has been put into use in all the sections of the first elevator shaft;

installing an additional crash deck between a lowermost section of the sections of the first elevator shaft and a second section of the sections of the first elevator shaft that is above the lowermost section, the additional crash deck defining an opening therethrough; and lifting a container having additional guide rails therein from the lowermost section to the second section through the opening of the additional crash deck using the lifting device.

15. The method of assembling the elevator according to claim 14, further comprising mounting the container lifted by the lifting device on a side wall of the second section of the first elevator shaft.

16. The method of assembling the elevator according to claim 14, further comprising moving the elevator car in the first elevator shaft using a hoisting machine attached to a guide rail from among the first guide rails, the guide rail being mounted on a wall of the first elevator shaft.

17. The method of assembling the elevator according to claim 16, wherein the hoisting machine is attached to a back side of the guide rail from among the first guide rails, the elevator car is movable on a front side of the guide rail from among the first guide rails, and the front side is opposite the back side.

* * * * *